W. F. QUINBY.
Steam-Plow.

No. {734, 31,738.}

Patented Mar. 19, 1861.

Witnesses.
J. W. Coombs.
R. S. Spencer.

Inventor.
W. F. Quinby
per Munn & Co
Attys.

United States Patent Office.

W. F. QUINBY, OF STANTON, DELAWARE.

IMPROVEMENT IN CULTIVATORS.

Specification forming part of Letters Patent No. 31,738, dated March 19, 1861.

*To all whom it may concern:*

Be it known that I, W. F. QUINBY, of Stanton, in the county of New Castle and State of Delaware, have invented a new and Improved Rotary Digging and Pulverizing Machine; and I do hereby declare that the following is a full, clear, and exact description thereof, reference being had to the accompanying drawings, making a part of this specification, in which—

Figure 1:
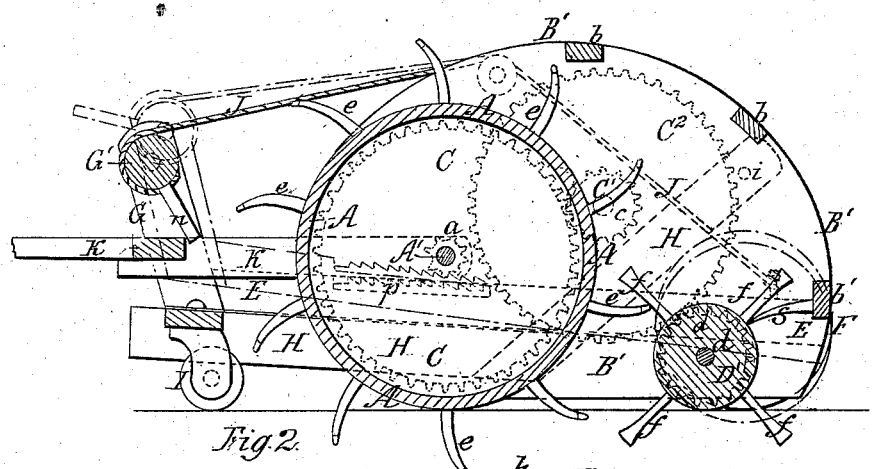
Figure 2:
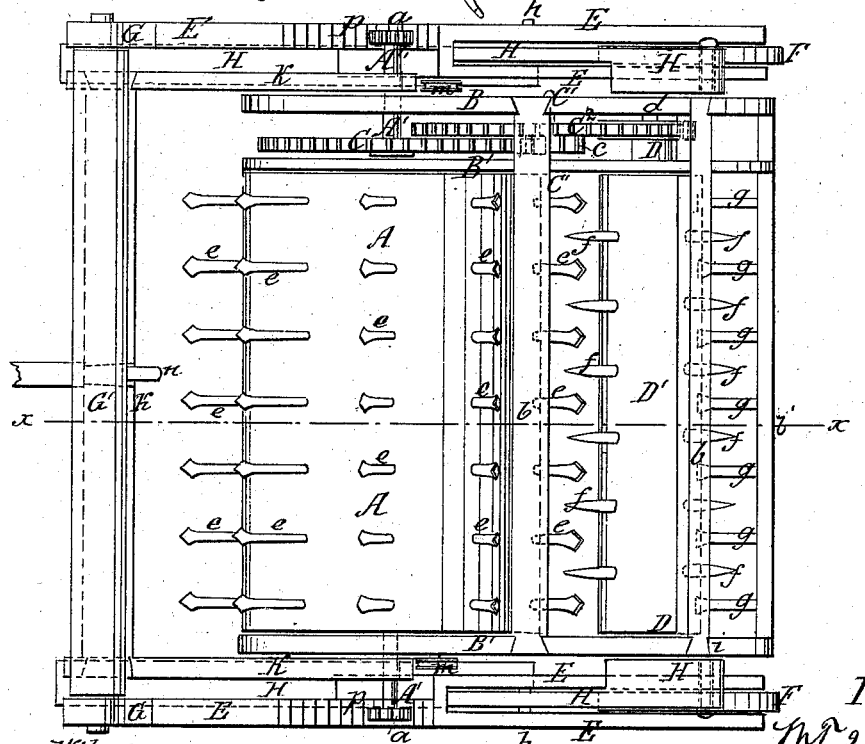

Figure 1 is a longitudinal section through the improved machine, taken in the vertical plane indicated by the red line $x\,x$ in Fig. 2. Fig. 2 is a top view of the machine.

Similar letters of reference indicate corresponding parts in both figures.

My invention relates to a novel machine for digging up the earth as deep as may be desired and then pulverizing the soil by cutting up the clods and loosening the slices.

The nature of my invention consists in combining two or more cylinders or drums of a suitable size, by cogs, belts, or chains, in such a manner that the revolution of the foremost cylinder shall give a greater relative speed to the rear cylinder or cylinders, and in arranging on the peripheries of said cylinders a suitable number of spurs, spikes, knives, or cutting-teeth of any desired description, said cylinders being so arranged within a framework which is mounted on a jointed carriage-frame that the driving-cylinder can be raised or depressed at pleasure and the teeth on this cylinder withdrawn entirely or partially from the ground, all as will be hereinafter described.

To enable those skilled in the art to make and use my invention, I will proceed to describe its construction and operation.

A represents a large driving-cylinder, which has a shaft, A', passing through its axis and projecting from each end a suitable distance. Shaft A' carries on its extreme ends two small spur-wheels, $a\,a$, and the bearings of this shaft A' are in a frame consisting of three elliptical boards, B B' B', and transverse brace-bars $b\,b\,b'$.

Between the boards B B' and keyed to the shaft A' of the driving-cylinder A, is a large spur-wheel, C, the teeth of which engage with those of a pinion, $c$, on a short shaft, C', which has its bearings in the boards B B', in rear of the cylinder-shaft A'. Shaft C' also carries a large spur-wheel, C², the teeth of which engage with those of a pinion, $d$, which is keyed to the shaft D of a small cylinder, D', arranged behind cylinder A. Shaft D has its bearings in the boards B B' B'.

The two cylinders A and D' are furnished with a number of rows of teeth, lettered respectively $e$ and $f$. The teeth $e$ are intended for turning the sod or soil, and the teeth or cutters $f$, succeeding them, cut and pulverize the soil which has been turned up by the teeth $e$. These teeth may be made of any suitable shape found best adapted to the purpose for which they are intended, and they may be secured to the cylinders in any suitable manner.

In rear of the small cylinder D' and projecting out from bar $b'$ are a number of teeth, $g$, between which the teeth of cylinder D' work. The teeth $g$ are used to clear the teeth or cutters $f$ of cylinder D' of roots, &c., which may adhere to them. The teeth of cylinder A pass between the teeth of cylinder D' in the rotations of these cylinders, and the teeth will all clear themselves in this manner and keep in good operating condition.

E E are two longitudinal timbers, having their rear ends forked, as represented in Fig. 2, and between these forked ends are wheels F F, which roll on the ground when the digging and pulverizing apparatus is raised from the ground, as will be hereinafter described. The front ends of these timbers E E have posts or arms G G projecting up from them, which carry a transverse roller, G, the ends of which have their bearings in the upper ends of said timbers. These longitudinal timbers E E are pivoted at the points $h\,h$ to the inclined arms of a frame, H. Frame H is mounted at its front end on a caster-wheel, I, and it is pivoted at its rear end, at $i\,i$, (represented in Fig. 1,) to the sides of the boards B B'. The inclined arms of frame H pass through the forked ends of the longitudinal timbers E E, and to these arms of frame H the longitudinal timbers E E are pivoted at $h\,h$, as before described. The front end of frame H rests on the projecting ends of a cross-piece which connects the two front ends of longitudinal timbers E E together when the cylinders are in operation.

J J are cords or chains, which are attached at their rear ends to the rear ends of the longitudinal timbers E E, and which pass up and over the pulleys m m, pivoted to side boards B B', thence to the roller G', to which the front ends of the cords J J are secured. By winding the cords on the roller G', a lever-arm, n, being secured to the roller for this purpose, the cords will elevate the front ends of the longitudinal timbers E E and bring the racks p p on these timbers up to the pinion spur-wheels a a on the ends of the shaft A' of the cylinder A. The further rotation of the cylinder A will cause the wheels a a to run up the inclined racks until this cylinder and its teeth, together with the rear cylinder, D', and its teeth, are elevated free from the ground. The entire machine may then be rolled about from place to place on the three wheels F, F, and I.

K is a frame, the longitudinal arms of which are pivoted to the axle A' of cylinder A. This frame projects out in front of the cylinder A, and the draft pole or chain is attached to it.

The cylinders A and D' may be constructed of wood or iron, or both; and they may be made to rotate in the same direction or in opposite directions.

The teeth of the main driving-cylinder A may be composed of iron or steel and flattened transversely, so as to dig up the earth in the most suitable manner.

The teeth of cylinder D' may be made straight and radial with the axis of their cylinders. They should have sharp cutting-edges for cutting readily through roots, &c. Then behind the cylinder D' the stationary teeth g should be so arranged as to clear the cutting-teeth f and to keep them from clogging.

A suitable device will be applied to the roller G to prevent it from turning back when the cords J J are wound upon it.

Having thus described my invention, what I claim as new, and desire to secure by Letters Patent, is—

The employment of two or more rotary cylinders, A D', armed with suitable teeth secured to their peripheries, and so combined that the revolution of the foremost cylinder shall give a greater relative speed to the rear cylinder or cylinders, said cylinders having their bearings in a suitable frame, which is mounted in a carriage consisting of frame E E, wheels F F, jointed frame H H, and front wheel, I, cords or chains J J, pulleys m m, and roller G, or their equivalents, all combined and operating substantially as and for the purposes herein set forth.

W. F. QUINBY.

Witnesses:
  WM. T. MASSEY,
  JOHN C. HIGHFIELD.